United States Patent [19]
Rubin

[11] 3,852,505

[45] Dec. 3, 1974

[54] PROCESS FOR PREPARING SHRIMP

[75] Inventor: Leon Rubin, New York, N.Y.

[73] Assignee: Atlantic Corporation, New York, N.Y.

[22] Filed: Aug. 21, 1973

[21] Appl. No.: 390,195

Related U.S. Application Data

[63] Continuation-in-part of Ser. No. 153,877, June 16, 1971, abandoned.

[52] U.S. Cl............... 426/370, 426/376, 426/512, 426/513
[51] Int. Cl............................................ A23l 1/325
[58] Field of Search ........... 426/212, 272, 370, 376, 426/512, 513, 517, 524

[56] References Cited
UNITED STATES PATENTS

| | | | |
|---|---|---|---|
| 1,608,832 | 11/1926 | Birdseye | 99/111 |
| 1,989,383 | 1/1935 | Schuck | 99/158 X |
| 2,555,232 | 5/1951 | Guice et al. | 99/111 X |
| 3,152,915 | 10/1964 | Cover et al. | 99/195 |
| 3,579,359 | 5/1971 | Schjolberg | 99/195 |
| 3,607,315 | 9/1971 | Partyka | 99/195 |
| 3,615,686 | 10/1971 | Marshall | 426/305 |

*Primary Examiner*—Raymond N. Jones
*Assistant Examiner*—Ernest G. Therkorn

[57] ABSTRACT

A process is provided for preparing shrimp for market from very small decapitated and deshelled refrigerated shrimp by tempering the same followed by braying, agitation at relatively high speed, discomposing and fluttering, thereafter molding the thus prepared shrimp at high pressure and low temperature. The product produced is also described.

3 Claims, No Drawings

PROCESS FOR PREPARING SHRIMP

This application is a continuation-in-part of my application Ser. No. 153,877 filed June 16, 1971, now abandoned, the contents of which are hereby made a part hereof as if fully copied herein.

In that application one of the important points was that very small shrimp and commercial shrimp fragments, due to the nature of the processing procedure, became bound together, thereby making it unnecessary to add any extraneous binding material such as proteins or amino acids even though such was incidentally set forth as an optional feature. While the procedure of that application has been found to be satisfactory and workable, certain important and significant advances and improvements have been found to be possible which make the procedure more effective and the product better.

In further investigations concerning the natural binding material present and in making suitable tests and analyses it has been found that the very small shrimp and shrimp fragments used in making saleable molded shrimp of commercial size contained between 23.0 and 25.4 percent protein by weight and further that such protein is that desirable form of edible protein which is classified as "first class" which is the type of edible protein existing in and being obtainable from animals whereas biologically there is a "second class" of edible protein existing in and obtainable from vegetable matter. Thus, the "first class" protein here involved is of animal origin whereas the "second class" protein which is not involved here is of vegetable origin. Proteins of animal origin are substantially meat and fish proteins which are chemically and biologically complete and are not only "first class" proteins, but fish protein from seafood or shellfish such as shrimp has a higher digestibility as compared with beef protein, for example. Proteins in general comprise a large class of naturally occurring complex combinations of amino acids usually composed primarily of carbon, hydrogen, oxygen, nitrogen and sulphur and sometimes phosphorus, iron and other elements which are essential constituents of living animal cells. Proteins are either acidic or basic in their fundamental nature and are frequently in a colloidal state as they exist in nature, although various proteins have been found to be crystallizable and can be isolated and purified in crystal form. Proteins are usually hydrolyzable by acids, but also can be broken down by alkalis and proteolytic enzymes as well as certain (putrefactive) bacteria to polypeptides, simpler peptides and ultimately to $\alpha$-amino acids which can according to their chemical composition be simple or conjugated. Many proteins are water-soluble or soluble in salt solutions. In protein molecules the constituent amino acids are linked together by peptide bonds and such linkage forms the backbone of the molecule and can be represented by a unit, a number of which form a complete protein in a manner analogous to the way in which a polymer is represented by one of its repeating monomeric units.

According to the present invention very small shrimp alone and after decapitation and deshelling and optionally deveining or admixed with left over fragments of larger shrimp are subjected to a series of processing steps which have now been found to be of critical significance in order to obtain best results and without adding any binding material whatever and while placing the material to be processed in such condition as to take best advantage of the inherent protein content already present and its binding capacity for present purposes. In general this is done by tempering the prepared very small shrimp with or without the admixed fragments of larger shrimp from this refrigerated state within the range of $-5°$ to $0°F$ by then bringing them relatively gradually up to a temperature of $+20°F$ and ultimately to $30°$ to $33°F$. The thus tempered shrimp is then subjected to braying through a one-eighth inch aperture following which the brayed material is agitated at $85 - 125$ rpm for precisely 5 minutes. Thereafter the tempered, brayed and agitated material is discomposed by trituration and then fluttered for $2 - 3$ minutes only at a temperature of between $+40°$ and $+55°F$, the material at the end of this period usually having approximately the latter temperature. The thus treated material is then molded by introducing it into single or multiple molds of aluminum, stainless steel, synthetic plastic, synthetic rubber or other suitable inert material at low temperature and high pressure under such conditions that no undesired discoloration or off-taste is imparted to the molded shrimp which when removed from the shrimp-shaped molds, which are ordinarily coated with an approved mold release agent such as Teflon, have unusual self-cohesive properties so that the molded shrimp can be handled, stored, shipped and ultimately used in restaurants and by the housewife in all the regular ways, such as boiling and breading and frying, in which natural commercial size shrimp are used without disintegrating, crumbling or otherwise losing their molded shape. No heating or helical extruding is used during the processing of the shrimp and shrimp fragments.

In carrying out the tempering step above referred to, this is done in a special tempering room by transferring thereto cleaned shrimp from a warehouse in which the temperature is controlled in the range of $-5°$ to $0°F$ and when the shrimp are treated in such tempering room they remain therein until they reach a more or less ambient temperature and ultimately after a relatively short period of time reach the $+20°$ to $+30°F$ temperature range above referred to, the best and correct temperature being $33°F$. It has been found that by so doing the shrimp, which are for instance piled on a sheet of aluminum, etc. on a wire grill, are thereby conditioned to withstand friction and incidental heat created during the subsequent step of braying. Braying as used herein means essentially forcing the shrimp or shrimp mixture through equipment in the nature of a meat grinder having a plate provided with a one-eighth inch hole or opening. This places the shrimp or shrimp mixture in smooth, moist condition for subsequent treatment and exposes the right amount of surface area so that when the shrimp thus treated are next agitated in the succeeding step at $85 - 125$ rpm in a suitable mixer or agitating machine, the proteins in the shrimp attain a special degree of trituration so that exceptional bonding becomes possible. It has been found in practice that agitation should be carried out for precisely 5 minutes and while some minor variation is permissible, the full benefits of the invention are not obtained if the agitation time appreciably departs from the 5-minute period. A shorter period of time gives a poorer bonding effect and consistency and a longer period of time is unnecessary and uneconomical, may result in excessive defibering and does not have any known advantage.

Subsequent to agitation the shrimp are then discomposed to make them deranged, i.e., disordered or disrupted physically as in random orientation. While this can be carried out by hand, for commercial reasons it is done mechanically. The discomposing is a strong or almost violent churning action as by a mechanical rotating and/or vibrating element which is carried out until by observation and experience the protein present reaches the correct amount of derangement and the desired viscosity and consistency. Thereafter the shrimp is fluttered (in the same machine if desired) by rapid, frequent and irregular or eccentric vibrations of a vibrator for a period of 2 – 3 minutes, but no longer and at a temperature in the range of +40° to +55°F. While it is possible to carry out the fluttering action by hand, such is only practicable on a commercial scale by using suitable commercial equipment and both the fluttering time and temperature have found to be critical and should not be appreciably varied. At this point the shrimp are ready for molding which is the final step as set forth above and in my copending application and due to the sequence and character of processing steps above described it has been found that the shrimp when molded at 125 psi and then subjected to freezing below 32°F and down to −300°F as in the presence of liquified nitrogen are not only in a form closely resembling or duplicating natural shrimp, but they do not disintegrate or break up into small pieces either when they are removed from the mold and handled or when they are packed and shipped, or when they are cooked as by being boiled or breaded and fried. They thus have exceptional cohesiveness.

It has been found to be important to follow the steps set forth and to adhere to the stated conditions for successful and optimal results. The processing described can be carried out in commercially existing and available equipment which, however, does not constitute a limitation on the invention. The resulting molded shrimp of commercial size and economic value form a part of the invention. While usually the very small shrimp from the Indian Ocean or other localities are decapitated and deshelled by inexpensive local labor, the starting shrimp may be deveined or not as desired, it being found that leaving the main vein in place adds to the characteristic shrimp taste and presents no disadvantage. It is also to be understood that all processing is carried out under sanitary conditions to avoid contamination and spoiling.

What is claimed is:

1. A process for preparing molded shrimp from very small shrimp with or without fragments of larger shrimp which consists in subjecting very small decapitated and deshelled refrigerated shrimp to tempering until they rise from a chilled temperature of between −5° and 0°F to a temperature of about 20° to 30°F, passing the tempered shrimp through a one-eighth inch aperture to effect braying, thereby placing said shrimp in a smooth moist condition for subsequent treatment, agitating the thus treated shrimp for 5 minutes at 85 to 125 rpm, discomposing the thus agitated shrimp to effect trituration, fluttering the triturated shrimp for 2 – 3 minutes at 40° to 55°F and then subjecting the same to molding at high pressure of 50 to 150 psi and low temperature of below 32°F and down to −300°F to produce a form closely resembling natural shrimp and which does not disintegrate or break up into small pieces.

2. A process according to claim 1 wherein the tempering is carried out in an enclosure into which the refrigerated shrimp are introduced in bulk and permitted to rise in temperature to a maximum of 33°F.

3. A process according to claim 2 wherein the agitation is followed by trituration and then by fluttering under vibration.

* * * * *

UNITED STATES PATENT OFFICE
CERTIFICATE OF CORRECTION

Patent No. 3,852,505             Dated December 3, 1974

Inventor(s) Leon Rubin

It is certified that error appears in the above-identified patent and that said Letters Patent are hereby corrected as shown below:

The name of the assignee should be changed to

ATALANTA CORPORATION from ATLANTIC CORPORATION.

Signed and sealed this 18th day of February 1975.

(SEAL)
Attest:

RUTH C. MASON
Attesting Officer

C. MARSHALL DANN
Commissioner of Patents
and Trademarks